United States Patent
Andersen

(10) Patent No.: US 7,326,263 B2
(45) Date of Patent: Feb. 5, 2008

(54) METHOD AND APPARATUS FOR HYDROGENATING HYDROCARBON FUELS

(76) Inventor: Erling Reidar Andersen, Gressvikveien 32A, 1621 Fredrikstad (NO)

( * ) Notice: Subject to any disclaimer, the term of this patent is extended or adjusted under 35 U.S.C. 154(b) by 874 days.

(21) Appl. No.: 10/729,012

(22) Filed: Dec. 8, 2003

(65) Prior Publication Data

US 2004/0131541 A1    Jul. 8, 2004

Related U.S. Application Data

(60) Continuation-in-part of application No. 10/287,720, filed on Nov. 5, 2002, now Pat. No. 6,800,258, which is a division of application No. 09/620,250, filed on Jul. 20, 2000, now Pat. No. 6,506,360.

(51) Int. Cl.
C10J 1/00 (2006.01)
B01J 19/00 (2006.01)
B01J 7/00 (2006.01)
B01J 8/00 (2006.01)

(52) U.S. Cl. ............... 48/118; 48/116; 48/61; 422/305; 422/232; 422/233; 422/234; 422/239; 422/129

(58) Field of Classification Search ........... 48/116–118
See application file for complete search history.

(56) References Cited

U.S. PATENT DOCUMENTS

| | | | |
|---|---|---|---|
| 254,189 A | 2/1882 | Berland | 48/116 |
| 290,627 A * | 12/1883 | Beebe | 48/116 |
| 436,812 A | 9/1890 | Tallmadge | 48/118 |
| 490,437 A | 1/1893 | Hawkins | |
| 767,289 A | 8/1904 | Kirkwood | |
| 909,536 A | 9/1909 | Brindley | |
| 934,036 A | 9/1909 | Brindley | |
| 978,641 A | 12/1910 | Poe | 422/112 |
| 1,504,546 A | 8/1924 | Curtis | 99/336 |
| 1,565,249 A * | 12/1925 | Berry | 422/232 |
| 1,916,473 A | 7/1933 | Forrest | |
| 2,721,789 A | 10/1955 | Gill | 23/282 |

(Continued)

FOREIGN PATENT DOCUMENTS

CA    2116468    10/1998

(Continued)

OTHER PUBLICATIONS

Stockburger, D. et al., "On-line Hydrogen Generation from Aluminum in an Alkaline Solution". PROC.—Electrochem. Soc. (1992), 92-5 (Proc. Symp. Hydrogen Storage Mater., Batteries, Electrochem., 1991), 431-44, 1992, XP-001032928.

(Continued)

*Primary Examiner*—Glenn Caldarola
*Assistant Examiner*—Jennifer A. Leung
(74) *Attorney, Agent, or Firm*—Palmer C. DeMeo; Mario Theviault

(57) ABSTRACT

In the present invention, there is provided a process and an apparatus for hydrogenating hydrocarbon fuels. A receptacle is partly filled an aqueous solution containing sodium hydroxide. A hydrocarbon fuel is then introduced inside the receptacle atop the aqueous solution. Aluminum is introduced in the aqueous solution, thereby producing hydrogen gas. The hydrogen gas is bubbled through the hydrocarbon fuel for hydrogenating the fuel.

12 Claims, 10 Drawing Sheets

U.S. PATENT DOCUMENTS

| | | | |
|---|---|---|---|
| 3,348,919 A | 10/1967 | Shumway | 23/211 |
| 3,542,524 A | 11/1970 | Kimble et al. | 422/120 |
| 3,554,707 A | 1/1971 | Holmes | 23/282 |
| 3,561,926 A | 2/1971 | McElroy | 422/212 |
| 3,777,692 A | 12/1973 | Baccaglini et al. | 114/54 |
| 3,890,102 A | 6/1975 | Gathmann et al. | 422/220 |
| 3,942,511 A | 3/1976 | Black et al. | 126/248 |
| 3,957,483 A | 5/1976 | Suzuki | 75/0.5 R |
| 3,975,913 A | 8/1976 | Erickson | 60/645 |
| 4,064,226 A * | 12/1977 | Becker et al. | 423/657 |
| 4,223,661 A | 9/1980 | Sergev et al. | 126/204 |
| 4,269,818 A | 5/1981 | Suzuki | 423/657 |
| 4,340,580 A | 7/1982 | Suzuki | 423/657 |
| 4,598,552 A | 7/1986 | Weber | 60/673 |
| 4,643,166 A | 2/1987 | Hubele et al. | 126/263 |
| 4,670,018 A | 6/1987 | Cornwell | 44/1 E |
| 4,730,601 A | 3/1988 | Hubele et al. | 126/263 |
| 4,752,463 A | 6/1988 | Nagira et al. | 423/657 |
| 4,769,044 A | 9/1988 | Cornwell | 44/605 |
| 4,882,128 A | 11/1989 | Hukvari et al. | 422/119 |
| 5,143,047 A | 9/1992 | Lee | 126/263 |
| 5,286,473 A | 2/1994 | Hasebe | 423/657 |
| 5,833,934 A | 11/1998 | Adlhart | 422/239 |
| 5,867,978 A | 2/1999 | Klanchar et al. | 60/39.182 |

FOREIGN PATENT DOCUMENTS

| | | |
|---|---|---|
| CA | 2225978 | 6/1999 |
| DE | 2436002 | 12/1976 |
| DE | 3401194 | 7/1985 |
| EP | 312078 | 4/1989 |
| FR | 2465683 | 4/1981 |
| JP | 401208301 | 2/1988 |
| WO | WO 94/18117 | 8/1994 |

OTHER PUBLICATIONS

Belitskus, David: "Reaction of Aluminum with Sodium Hydroxide Solution as a Source of Hydrogen", J. Electrochem. Soc. (1970), (Aug.), 1097-9, 1970, XP-002180270.

* cited by examiner

METHOD AND APPARATUS FOR HYDROGENATING HYDROCARBON FUELS

This is a continuation-in-part of U.S. patent application Ser. No. 10/287,720, filed on Nov. 5, 2002, now U.S. Pat. No. 6,800,258, which is a division of U.S. patent application Ser. No. 09/620,250 filed on Jul. 20, 2000, now U.S. Pat. No. 6,506,360.

FIELD OF THE INVENTION

This invention relates to the production of hydrogen gas from a catalytic reaction of aluminum and water, and the mixing of the hydrogen gas into a hydrocarbon fuel to improve the combustion efficiency of the fuel.

BACKGROUND OF THE INVENTION

Generally speaking, it is known that under certain conditions, aluminum reacts with water to generate hydrogen and heat. It is also known, however, that this type of reaction is not sustainable at ambient temperature. It is believed that a protective oxide layer forms on a metal surface in contact with water at ambient temperature and hampers the reaction. Therefore, it has been accepted by those skilled in the art that the use of aluminum in a reaction with water to generate heat and hydrogen gas requires that the protective oxide layer is efficiently and continuously removed, and that the reaction is kept at an elevated temperature.

A number of hydrogen generators have been developed in the past. The following patent documents constitute a good inventory of the devices and methods of the prior art in the field of hydrogen gas generation using the reaction of aluminum or alloys of aluminum with water.

U.S. Pat. No. 909,536 issued on Jan. 12, 1909, and U.S. Pat. No. 934,036 issued on Sep. 14, 1909, both issued to G. F. Brindley et al. These documents disclose several compositions for generating hydrogen. The compositions comprise any metal which can form an hydroxide when it is brought into contact with a solution of a suitable hydroxide. For example, aluminum is reacted with sodium hydroxide to release hydrogen and produce sodium aluminate.

U.S. Pat. No. 2,721,789, issued on Oct. 25, 1955 to Q. C. Gill. This document discloses the structure of an hydrogen generator for reacting water with a measured dry charge of aluminum particles and flakes of sodium hydroxide. The reaction releases hydrogen gas and produces sodium aluminate.

U.S. Pat. No. 3,554,707 issued on Jan. 12, 1971 to W. A. Holmes et al. This document discloses a gas generator having bellows to raise or lower the level of water in response to the pressure inside the generator. As the level of water drops, the contact surface between the fuel cartridge and the water is lost and the reaction is terminated.

U.S. Pat. No. 3,957,483 issued on May 18, 1976 to M. Suzuki. This patent discloses a magnesium composition which produces hydrogen upon contact with water. The preferred magnesium composition comprises magnesium, and one or more metals selected from the group consisting of iron, zinc, chromium, aluminum and manganese.

U.S. Pat. No. 3,975,913 issued on Aug. 24, 1976 to D. C. Erickson. This document discloses a hydrogen generator wherein molten aluminum is reacted with water. The generator is kept at a very high temperature to keep the metal in a molten condition.

U.S. Pat. No. 4,643,166 issued on Feb. 17, 1987, and U.S. Pat. No. 4,730,601 issued on Mar. 15, 1988 both to H. D. Hubele et al. These documents disclose the structure of a fuel cell for producing heat energy and hydrogen gas. The device has a reaction chamber containing a fuel composition that is reactive with water. The fuel composition includes a main fuel part of magnesium and aluminum in a molar ratio of 1:2, and the second part is composed of lithium hydride, magnesium and aluminum in equal molar ratio.

U.S. Pat. No. 4,670,018 issued on Jun. 2, 1987, and U.S. Pat. No. 4,769,044 issued on Sep. 6, 1988, both to J. H. Cornwell. These documents describe a log made of compressed wood waste and paper. The log is coated with aluminum particles. Upon burning, the aluminum particles react with moisture in the log to emit heat due to the generation of hydrogen gas.

U.S. Pat. No. 4,752,463 issued on Jun. 21, 1988 to K. Nagira et al. This document discloses an alloy which reacts with water for producing hydrogen gas. The alloy material comprises essentially aluminum and 5 to 50% tin.

U.S. Pat. No. 5,143,047 issued on Sep. 1, 1992 to W. W. Lee. This document discloses an apparatus and a method for generating steam and hydrogen gas. In this apparatus, an aluminum or aluminum alloy powder is reacted with water to generate hydrogen gas. An electric power source is used to start the reaction. The electric power source is used to explode an aluminum conductor and to disperse pieces of molten aluminum into a mixture of water and aluminum powder. A heat exchanger is provided to extract useful heat.

U.S. Pat. No. 5,867,978 issued on Feb. 9, 1999 to M. Klanchar et al. This document discloses another hydrogen gas generator using a charge of fuel selected from the group consisting of lithium, alloys of lithium and aluminum. The charge of fuel is molten and mixed with water to generate hydrogen gas.

JP 401,208,301 issued to Mito on Aug. 22, 1989. This document discloses a process for producing hydrogen. Aluminum is reacted with water under an inactive gas or a vacuum to produce hydrogen gas.

CA 2,225,978 published on Jun. 29, 1999 by J. H. Checketts. This patent application discloses a hydrogen generation system wherein a coating on reactive pellets is selectively removed to expose the reactive material to water for producing hydrogen gas on demand. In one embodiment, aluminum and sodium hydroxide are reacted with water to release hydrogen gas and produce sodium aluminate.

Various other processes to produce hydrogen gas have been described in the art, as reacting water with magnesium, sodium, potassium, lithium, calcium, iron, zinc or steel.

Although the hydrogen production processes of the prior art deserve undeniable merits, it is believed that the catalytic reaction of aluminum and water, using sodium hydroxide as the catalyst, to release hydrogen gas from water at room temperature has never been anticipated or observed and disclosed by prior inventors. It is also believed that the prior art is short of suggestion with regards to a hydrogen production process which can be readily used to hydrogenate the fuel of engines and burners.

As such, it will be appreciated that there continues to be a need for a production process and for an apparatus for generating hydrogen gas using a simple and economical reaction which can be started at room temperature and carried out safely by ordinary persons not having a formal education in chemistry and chemical processes.

SUMMARY OF THE INVENTION

Broadly stated, the process for producing hydrogen gas according to the present invention consists of reacting aluminum with water in the presence of sodium hydroxide as a catalyst. This process is advantageous for being carried out at room temperature and for producing large quantities of heat and hydrogen gas at high purity. The process and apparatus are easily connected to the fuel lines of engines and burners to hydrogenate petroleum fuels.

In a first aspect of the present invention, there is provided a process for hydrogenating a hydrocarbon fuel, comprising the steps of providing a receptacle; partly filling this receptacle with an aqueous solution containing sodium hydroxide, and introducing aluminum in this aqueous solution, thereby producing hydrogen gas. The hydrogen gas is injected into a fuel line containing hydrocarbon fuel for hydrogenating the fuel and improving its combustion characteristics.

In a second aspect of the present invention, there is provided another process for hydrogenating a hydrocarbon fuel. This second process comprises the steps of providing a receptacle and partly filling this receptacle with an aqueous solution containing sodium hydroxide. A hydrocarbon fuel is then introduced inside the receptacle atop the aqueous solution. Aluminum is introduced in the aqueous solution, thereby producing hydrogen gas. The hydrogen gas is bubbled through the hydrocarbon fuel for hydrogenating the fuel.

In a third aspect of the present invention, there is provided an apparatus for hydrogenating a hydrocarbon fuel. This apparatus comprises broadly a receptacle and a conduit and control devices to introduce an aqueous solution in this receptacle and to maintain the solution at a specific level. The apparatus also comprises an aluminum storage and delivery system to introduce aluminum inside the receptacle below the specific level. A fuel piping system is provided to introduce, to float and to circulate a hydrocarbon fuel inside the receptacle above the specific level. This apparatus is usable in a continuous process to hydrogenate a continuous flow of hydrocarbon fuel to a large diesel engine or to the burners of an industrial boiler for examples.

The latter process and apparatus are also advantageous for cleaning the hydrogen gas of any water vapour and condensate as these impurities are filtered out by the fuel layer. The hydrogen gas floating through the fuel layer is relatively clean.

Other advantages and novel features of the present invention will become apparent from the following detailed description of the preferred embodiment.

BRIEF DESCRIPTION OF THE DRAWINGS

A preferred embodiment of the present invention selected by way of examples will now be described with reference to the accompanying drawings, in which.

DETAILED DESCRIPTION OF THE PREFERRED EMBODIMENT

Figure 1:
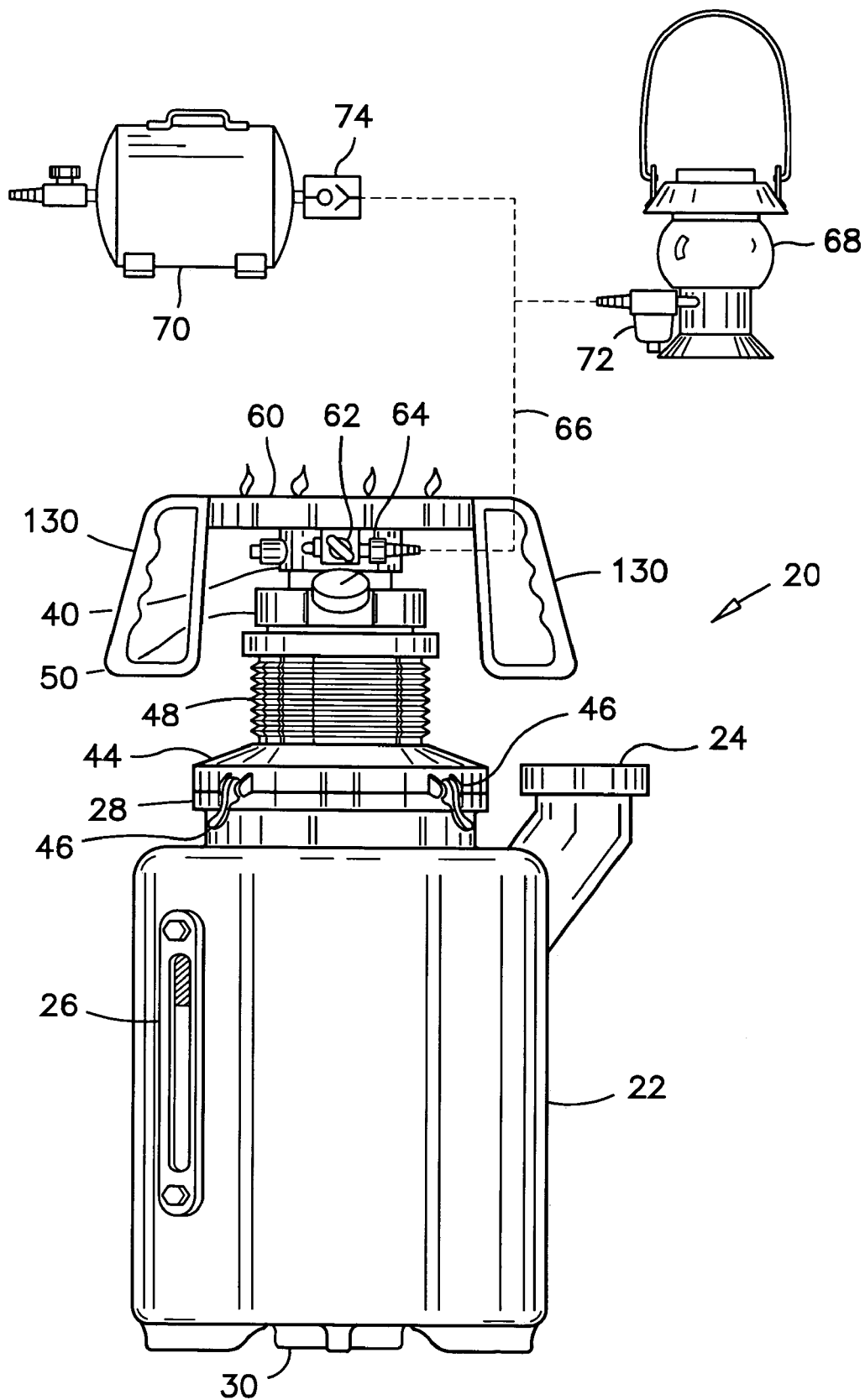
FIG. 1 is a side view of the preferred energy production apparatus, also referred to herein as the hydrogen generator.

While this invention is susceptible of embodiments in many different forms, there is shown in the drawings and will be described in details herein a specific embodiment of the method and apparatus according to the present invention, with the understanding that the present disclosure is to be considered as an example of the principles of the invention and is not intended to limit the invention to the embodiment illustrated.

The production of hydrogen gas according to the present invention is obtained by a reaction of aluminum with water in the presence of sodium hydroxide (NaOH) as a catalyst. The reaction produces a large amount of heat and hydrogen gas.

The catalyst is mixed with tap water in a proportion of about 225 g. per liter of water. In other words, the sodium hydroxide content of the catalytic solution is preferably about 18% by weight. The catalyst is not chemically consumed in the process.

The aluminum used in the reaction comprises aluminum foil, electrical wire, beverage cans and other similar aluminum waste. The intensity of the reaction depends upon the surface of contact between the aluminum and water. Aluminum foil for example reacts faster than a heavy gauge aluminum wire, and aluminum in a powdered form reacts instantly to produce hydrogen gas.

A series of eight experiments was carried out to measure the volume of hydrogen gas produced in a typical reaction. In these experiments, aluminum foil from Reynolds Aluminum Company of Canada was loosely crumpled and placed in a one liter plastic bottle containing 500 ml of catalytic solution. The bottle was quickly capped with a cover fitted with a tube which led to an inverted volumetric cylinder filled with water. The bottle was immersed in a water bath to prevent overheating.

The volume of water displaced by the gas produced was measured and corrected to a gas volume at standard temperature and pressure (STP).

Atmospheric pressure on that day was obtained from a local weather office. The corrected volume of gas produced was compared to the theoretical quantity of hydrogen gas, which would be obtained according to the equation, $$2Al + 3H_2O \underset{catalyst=NaOH}{\rightleftharpoons} Al_2O_3 + 3H_2$$

These experiments were carried out at a room temperature of 21° C. and an atmospheric pressure of 758 mm of Hg. In all cases the reaction started in few seconds and continued for few minutes, until depletion of the aluminum foil. It was noticed that a typical reaction with less than 5 grams of loosely crumpled aluminum foil, is complete in less than 5 minutes. The results of these experiments are shown in Table 1 below.

TABLE 1

Hydrogen Gas Production from Aluminum Foil

| Exp. (#) | Al (g.) | $H_2$ (l) | $H_2$ (l) (STP) | $H_2$ (l) Theoretical | Yield (%) | Deviation (+/− %) |
|---|---|---|---|---|---|---|
| 1 | 2.08 | 2.94 | 2.71 | 2.59 | 104 | 2.6 |
| 2 | 2.03 | 2.85 | 2.62 | 2.53 | 104 | 2.6 |
| 3 | 2.21 | 3.05 | 2.81 | 2.75 | 102 | 2.5 |
| 4 | 2.16 | 2.9 | 2.67 | 2.69 | 99 | 2.6 |
| 5 | 2.2 | 3.04 | 2.8 | 2.74 | 102 | 2.5 |
| 6 | 2.21 | 3.04 | 2.8 | 2.76 | 102 | 2.5 |
| 7 | 0.73 | 1.03 | 0.94 | 0.91 | 103 | 2.4 |
| 8 | 0.83 | 1.15 | 1.05 | 1.03 | 102 | 2.2 |
| Ave. | | | | | 102 | 2.47 |

The results from Table 1 show that the reaction is reproducible and produces stoichiometric quantities of hydrogen gas. The 102% average yield of hydrogen gas is considered to be within the measurement uncertainty; however, there are at least two factors which might have contributed to a slightly higher hydrogen yield. Firstly, the volume of gas produced was corrected to STP. It is possible that the exhausted fume hood in which the experiments were carried out could have lowered the reaction pressure below the atmospheric pressure of 758 mm of Hg. This would have increased the observed value for the volume of gas produced. An exhaust bench typically runs at 1 inch or 2 inches of water pressure. At a maximum, this could have increased the measured volume by about 0.5%. Secondly, the water used was tap water in all cases, in which dissolved air may have been present. If any of this air had been released in the presence of the warm hydrogen gas, this would have increased the volume of gas measured. This would have affected the results by less than 1%. Since the results are within the measurement error, and quantification of these two sources of error would not significantly affect the results, no further experiment was carried out in this area.

The procedure used in the above experiments was repeated, with the exception that the tube leading from the top of the reaction bottle was connected to a gas sampling bag. Two samples of gas were obtained and analysed. The results are presented in Table 2.

TABLE 2

| | Gas Analysis | |
|---|---|---|
| Sample | Hydrogen Concentration | Oxygen & Nitrogen |
| 1 | 92% | balance |
| 2 | 98% | balance |

Table 2 shows that the purity of the hydrogen collected in the second sample was 98%. This is close to what was theoretically expected. The lower 92% concentration observed in the first sample was probably due to the fact the system was not completely purged with hydrogen before the sample was taken. By the time the second sample was taken, most of the air had been purged from the tube and the reaction bottle.

Having explained the preferred method for producing hydrogen gas, the following disclosure and drawings describe a preferred apparatus for carrying out the method.

Figure 2:
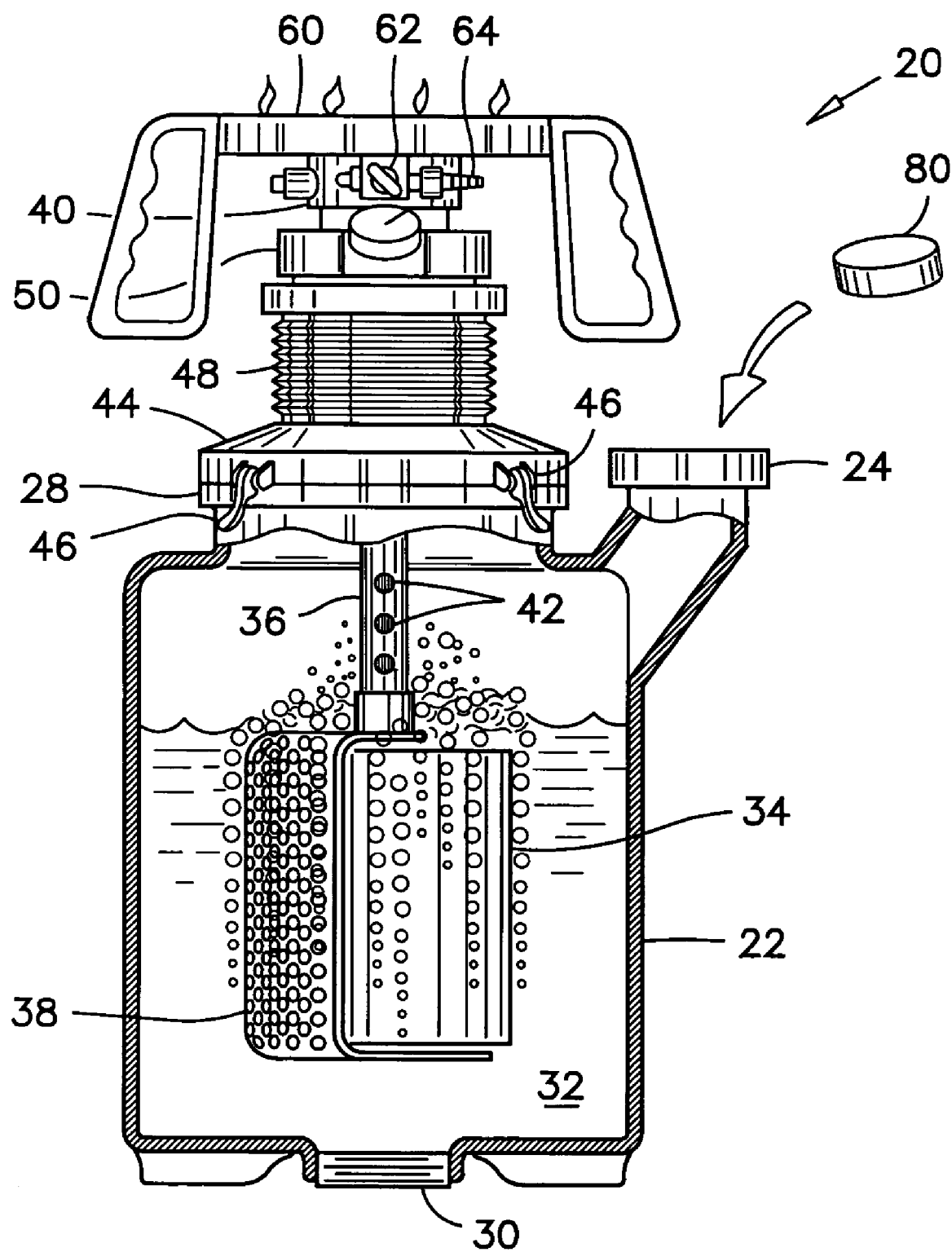
FIG. 2 is a cross-section view of the energy production apparatus illustrating a mode of operation thereof when the fuel cartridge is entirely immersed in water.

Referring firstly to FIGS. 1 and 2, an energy production apparatus according to the preferred embodiment of the present invention is illustrated therein. The energy production apparatus, also referred to herein as the hydrogen generator 20 is illustrated in these figures in its entirety. The hydrogen generator 20 uses water and aluminum particles as fuel, and sodium hydroxide (NaOH) as a catalyst and a surface conditioner to reduce the formation of oxide layers on the aluminum particles. The sodium hydroxide may be mixed or otherwise closely associated with the aluminum particles in a sufficient amount to ensure complete reaction of the aluminum particles with water in an energy production period. Further discussion on the incorporation of sodium hydroxide with the aluminum particles will be provided later, especially when making reference to FIGS. 10-13.

The sodium hydroxide may also be pre-mixed with water to form a catalytic aqueous solution in which aluminum is introduced to produced hydrogen gas on demand. In that case, only water and aluminum are added to sustain a reaction.

The hydrogen generator 20 comprises firstly a receptacle 22 having a first closable fill opening 24, a sight glass 26 for monitoring the level of water therein, and a second closable larger opening 28 in a central upper region thereof. The receptacle 22 also preferably has a clean out bung 30 through its bottom surface to facilitate the periodic removal of the reaction byproducts such as aluminum.

In use, the receptacle 22 is filled with water 32, to a level of between half and three-quarter of its capacity. A fuel cartridge 34 hanging from a vertical tube 36 is immersed into the water 32 for causing a chemical reaction to occur with the water, and for producing heat and hydrogen gas.

The fuel cartridge 34 is supported in a perforated basket 38 affixed to the vertical tube 36. The vertical tube 36 is connected to a gas handling manifold 40 mounted above the receptacle 22, and has a series of holes 42 therein for admitting the hydrogen gas into the gas handling manifold 40.

An annular cap 44 is also provided for mounting over the upper central opening 28 of the receptacle. Several clasps 46 are provided around the annular cap 44 for securing the annular cap 44 in a sealing manner to the upper central opening 28. It will be appreciated that the upper central opening 28 has a dimension to accommodate the insertion of the fuel cartridge 34 and the basket 38 inside the receptacle 22. It will also be appreciated that the clasps 46 may be replaced by other closure means for quickly and easily removing the annular cap 44, for replacing a spent fuel cartridge for example.

Upon the annular cap 44, there is provided a bellows 48 having an interior region communicating with the receptacle 22 such that the expansion and retraction of the bellows are relative to the pressure inside the receptacle. Atop the bellows 48, there is provided a timer mechanism 50, the operation of which will be described later. In the hydrogen generator according to the preferred embodiment 20, the gas handling manifold 40 is affixed to the upper portion of the vertical tube 36 above the timer mechanism 50.

The annular cap 44, the bellows 48, the timer mechanism 50 and the gas handling manifold 40 define with the receptacle 22 a closed space for containing and controlling the hydrogen gas being generated inside the receptacle 22.

A burner plate 60 is mounted over the gas handling manifold 40. The gas handling manifold 40 has conduit means communicating with the burner plate 60. A series of orifices are provided in the burner plate 60 to allow the burning of hydrogen gas for cooking food for example in a similar manner as is known of gas stoves. Although the illustrations show a side view of the burner plate 60 it will be appreciated that the burner plate 60 is preferably a circular plate similar to those mounted on common gas stoves.

The gas handling manifold 40 also has a selector valve 62 and a gas outlet fitting 64 communicating with the selector valve 62. The selector valve 62 is operable for selectively directing the hydrogen gas to the burner plate 60 or to the outlet fitting 64.

A flexible hose for example, as represented by dash lines 66, can be connected to the outlet fitting 64 and to a gas appliance such as a lantern 68 to conveniently use the hydrogen gas, or to a gas reservoir 70 for accumulating the hydrogen gas for later use. The appliance may have a water filter 72 thereon if needed or a check valve 74 to prevent any backflow of gas into the receptacle 22 at the end of an energy production period.

Figure 14:
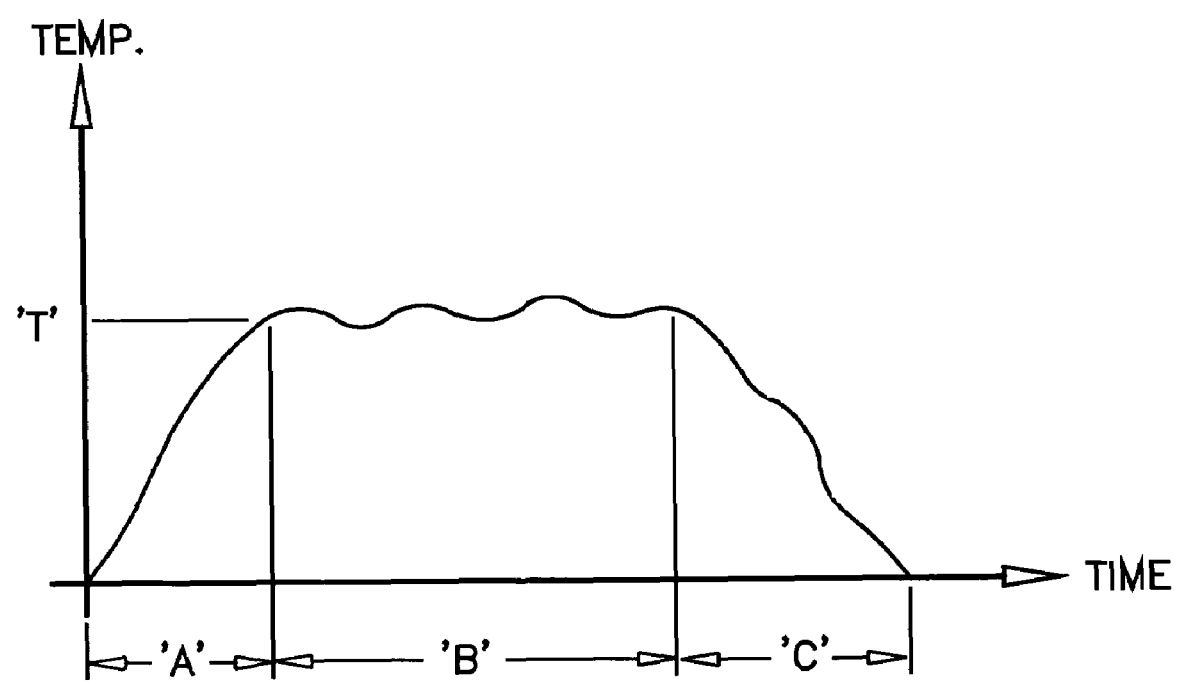
FIG. 14 illustrates a graph of temperature over time for a typical hydrogen gas production reaction.

With reference to FIGS. 2 and 14, it will be appreciated that a typical energy production period is known to have a heating phase 'A' during which the temperature inside the receptacle 22 rises; an active phase 'B' during which the temperature inside the receptacle 22 is preferably kept at around 85° C., and a cooling phase 'C' during which the reaction gradually stops. At an operation temperature 'T' during the active phase 'B' of about 85° C., the reaction has been found to be self-sustained and the hydrogen gas produced contained minimum water vapours.

The heating phase 'A' can be shortened by introducing a fuel pellet 80 inside the receptacle 22, through the fill opening 24. The fuel pellet 80 preferably contains very fine aluminum particles such as saw dust and filings for examples, compressed with waste paper bits that are impregnated with sodium hydroxide in a dry form. The small aluminum particles of the pellet 80 are known to be highly reactive with water to generate a burst of heat which causes the water temperature to approach the ideal temperature 'T' quickly, and to accelerate a reaction of the water with the larger fuel cartridge 34. Another fuel pellet 80 may also be introduced in the receptacle during the cooling phase 'C' to prolong the duration of an energy production period.

For example purposes, a fuel cartridge 34 having a volume of about one litre, that is about 500 ml of aluminum and about 500 ml of paper filler material impregnated with sodium hydroxide in a dry form, immersed in 10 litres of water is believed to be sufficient for producing heat and maintaining a reaction for about two hours, in which the active phase is about one hour, and the heating and cooling phases are about one-half hour each. It is believed that the amount of hydrogen gas produced during the active phase 'B' is sufficient for cooking food on the burner plate 60.

Figure 3:
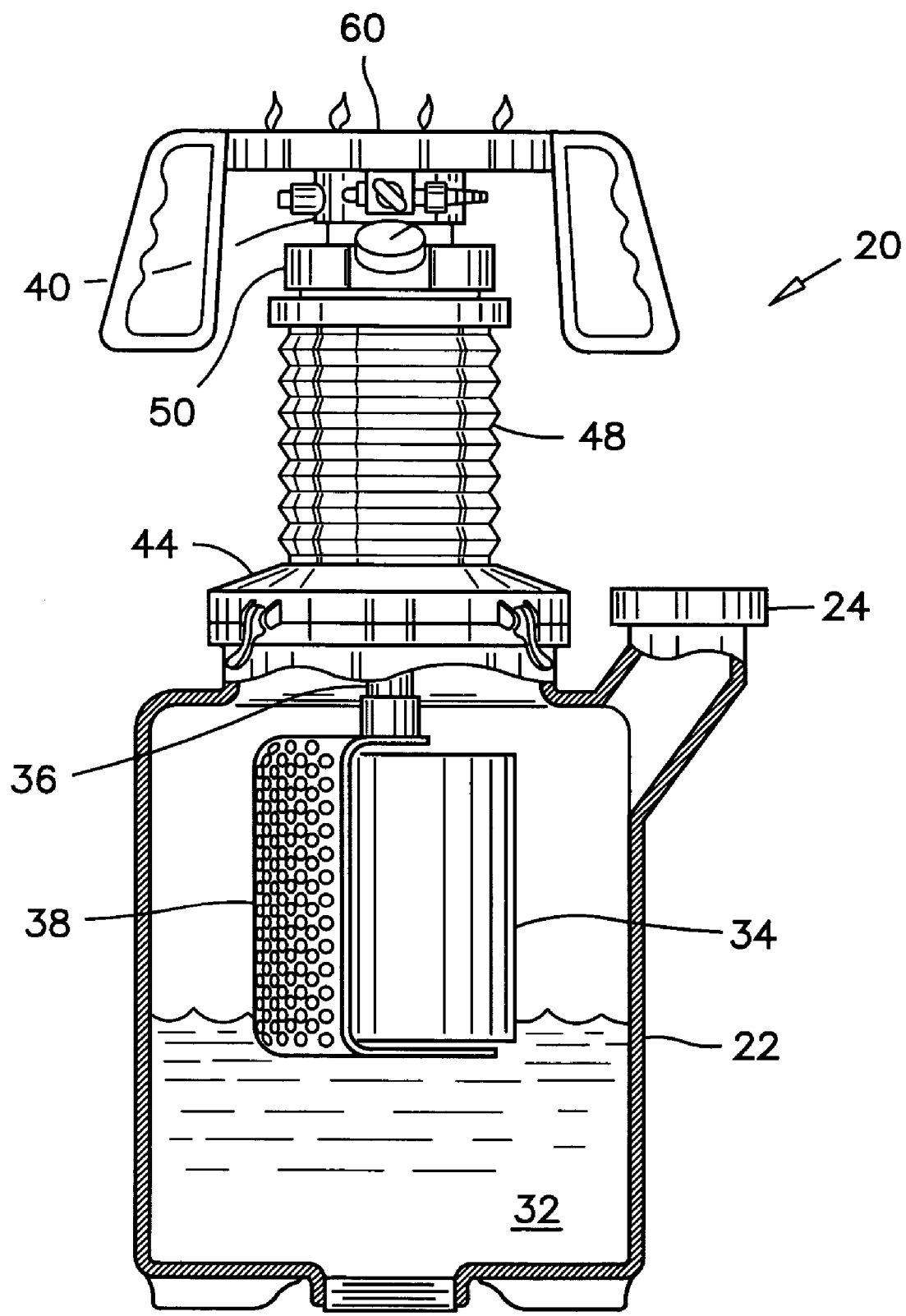
FIG. 3 is another cross-section view of the energy production apparatus with the fuel cartridge in a raised position when pressure inside the apparatus force the bellows of the apparatus to expand.

Referring now to FIG. 3, the operation of the bellows 48 is illustrated therein. When the reaction enters its active phase, the heat and pressure generated inside the receptacle 22 rise. The increase in pressure inside the receptacle 22 causes the bellows 48 to expand upward as illustrated in FIG. 3.

Because the basket 38 and the vertical tube 36 are supported to the gas handling manifold 40, and because the gas handling manifold 40 is affixed to the movable portion of the bellows 48, the expansion of the bellows 34 causes the fuel cartridge 34 to be lifted toward an upper region of the receptacle 22, and by the same doing, causes the water level to fall in the receptacle 22. The contact surface between water and the fuel cartridge 34 is thereby greatly reduced. The reaction is slowed down and the pressure and temperature inside the receptacle 22 are consequently also reduced. As temperature and pressure inside the receptacle 22 are reduced, the bellows 48 collapses to re-immerse the fuel cartridge 34 and to resume the active reaction phase.

Given the structure of the energy production apparatus 20 according to the preferred embodiment, it is believed possible to calibrate the characteristics of the bellows 48 for use with a specific size of receptacle 22 and a specific size of fuel cartridge 34, to precisely control the pressure and temperature of a reaction, such that the apparatus 20 will be practical and safe for use by the general public.

Figure 4:
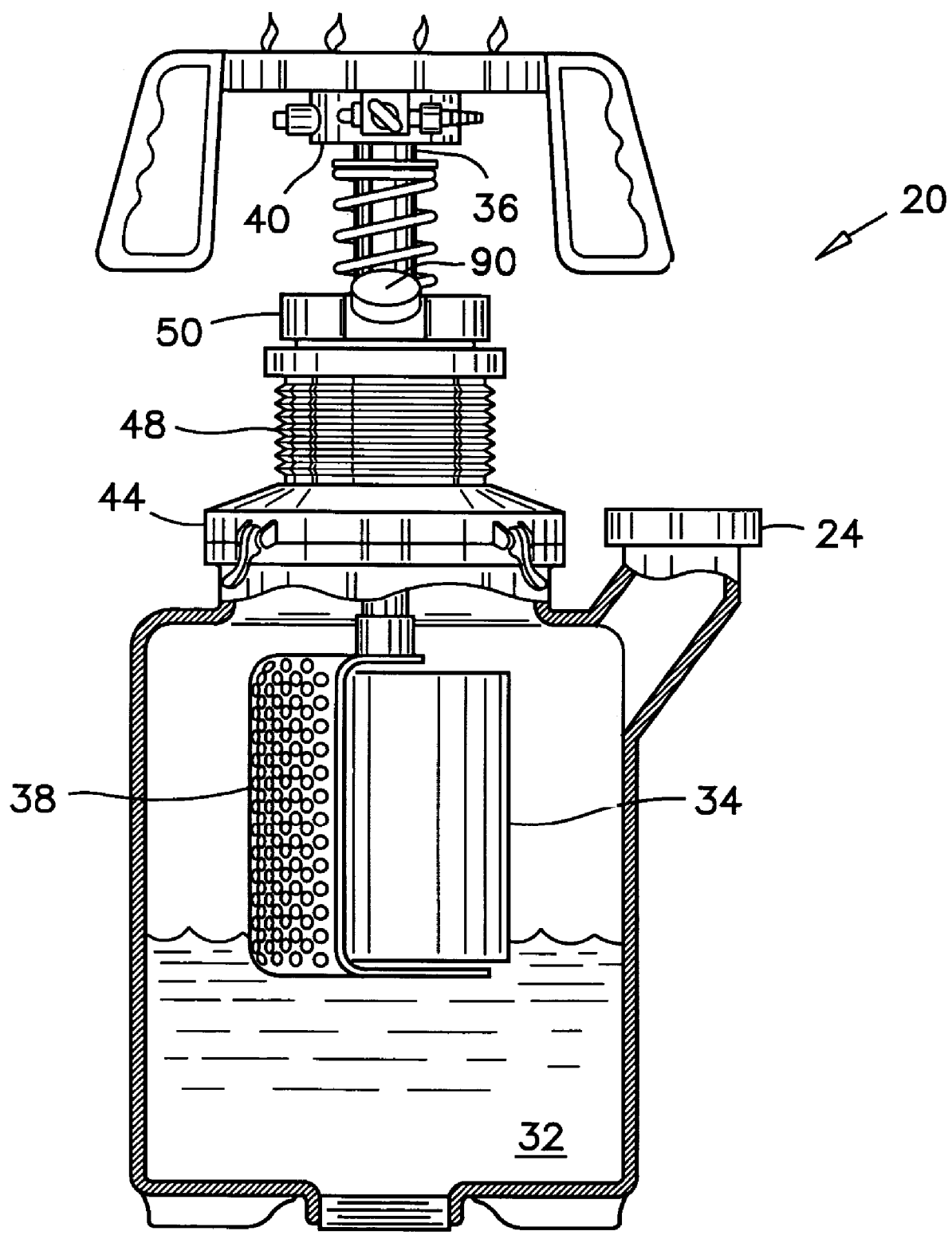
FIG. 4 illustrates yet another cross-section view of the energy production apparatus with the timer mechanism in an unlatched mode causing a spring to pull the cartridge out of the water.
Figure 8:
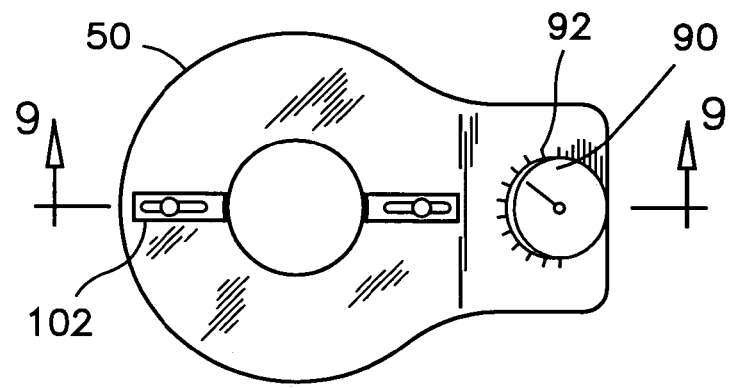
FIG. 8 is a top view of the preferred timer mechanism for use with the energy production apparatus.
Figure 9:
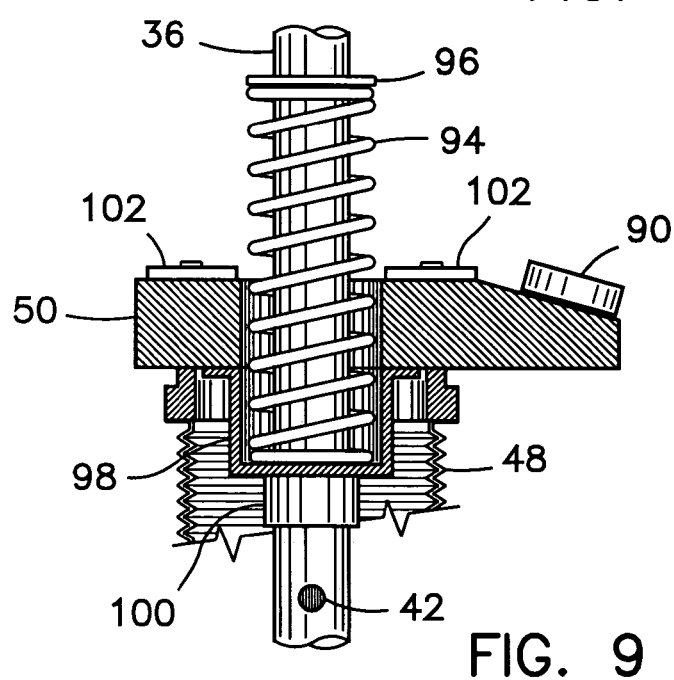
FIG. 9 is a partial cross-section view through the timer mechanism along line 9-9 in FIG. 8.
Figure 10:
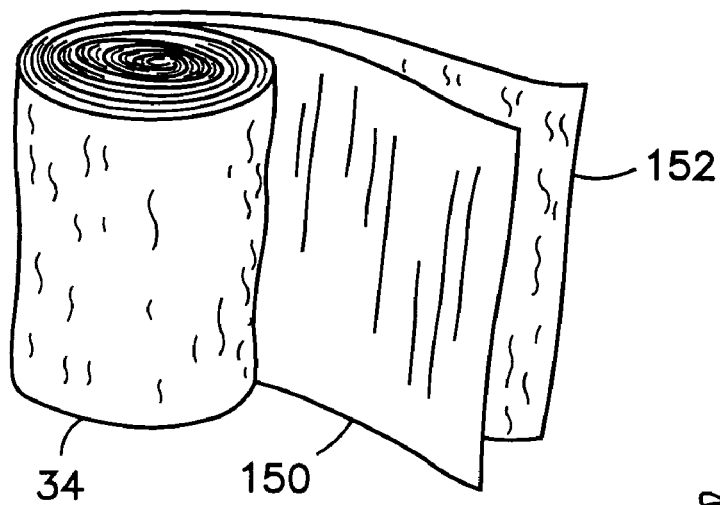
FIG. 10 illustrates a first arrangement for a fuel cartridge for use with the energy production apparatus.

With reference to FIGS. 4, 8 and 9, the functions of the timer mechanism 50 of the hydrogen generator 20 will be explained in details. The timer mechanism 50 is provided for further improving the safety of the hydrogen generator 20. The timer mechanism 50 is used for lifting the fuel cartridge 34 above the water 32 after a set time period, even when the bellows 48 remains in a collapsed mode. The reaction inside the receptacle 22 can thereby be manually stopped or caused to terminate at a set time period by adjusting a knob 90 relative to a dial 92.

The preferred timer mechanism 50 comprises a coil spring 94 mounted over the vertical tube 36 and an annular spring-abutment plate 96 affixed to the vertical tube 36 above the spring 94 for retaining the vertical tube 36 at a fixed position relative to the upper end of the spring 94.

The spring 94 is set in a cylindrical pocket 98 extending downward through the timer mechanism 50. The depth of the pocket 98 is sufficient to accommodate the spring 94 in a compressed form when the timer mechanism is in a latched mode. A seal 100 is affixed to the bottom portion of the pocket 98 around the vertical tube 36, for allowing a sliding movement of the vertical tube 36 through the timer mechanism 50, under the action of the spring 94, and for preventing hydrogen gas from leaking out of the bellows 48.

One or more latch tabs 102 are movably connected to the timer mechanism 50 and are linked to the operation of the selector knob 90. When the burner plate 60 is pushed down to immerse the fuel cartridge 34 in water, the latch tabs 102 engage with the annular spring-abutment plate 96 to keep the spring 94 in a compressed state inside the cylindrical pocket 98.

The linkages, the clockwork and other components mounted inside the timer mechanism 50 have not been illustrated herein for being common to those knowledgeable in latches and locks. In the preferred embodiment, however, the clockwork is a mechanical device not requiring electric power. Also in the preferred embodiment, the latched tabs 102 are in a latching position when the timer knob 90 is set at any time value, and are in an unlatching position when the knob 90 is set at or reaches zero (0) time on the dial 92.

Figure 5:
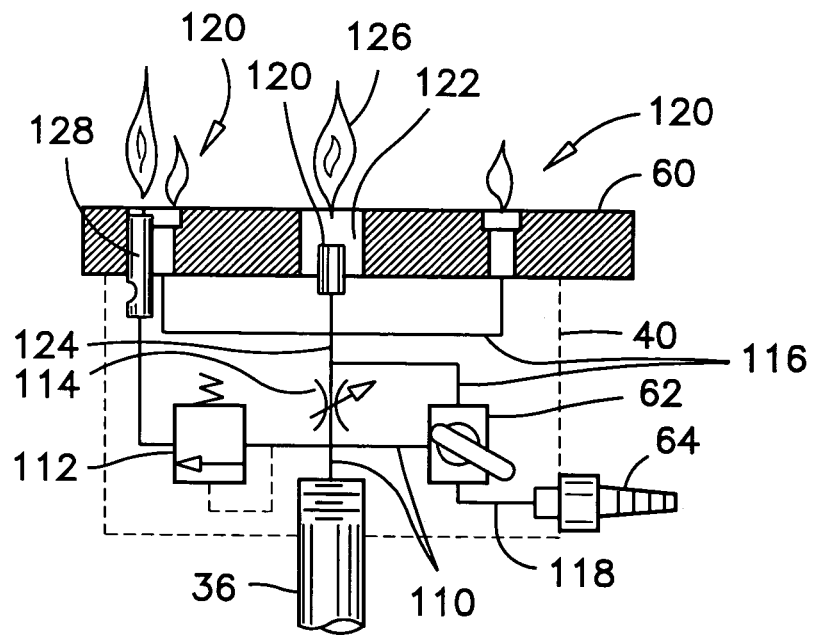
FIG. 5 is a schematic diagram of the preferred gas handling manifold and a burner plate mounted on the energy production apparatus.

Referring now to FIG. 5, the structure of the burner plate 60 and of the gas handling manifold 40 are explained therein in greater details. The outline of the gas handling manifold 40 is shown in dash lines to simplify the illustration. The gas handling manifold 40 comprises a first set of conduits 110 extending from the vertical tube 36 to the selector valve 62, to a pressure relief valve 112, and to a flow control valve 114; a second set of conduits 116 extending from the selector valve 62 to the burner plate 60; and a third conduit 118 extending from the selector valve 62 to the outlet fitting 64.

The burner plate 60 has a plurality of gas orifices 120 therein, and each gas orifice is preferably surrounded by one or more air injection holes 122 to admit oxygen around the gas orifice 120 during the burning of hydrogen gas.

In the preferred embodiment, a minimum amount of hydrogen gas is always directed to the gas orifices 120 to be burnt. The burning of this minimum amount of gas provides a visual indication of the operation of the apparatus 20, and prevents any accumulation of hydrogen gas in the room in which the apparatus is being used. For this purpose, a flow control valve 114 is provided in the gas handling manifold 40, and has a fourth conduit 124 bypassing the selector valve 62. Therefore, when the selector valve 62 is set to direct the hydrogen gas to the outlet fitting 64, a minimum amount of gas is still allowed through the flow control valve 114 and to the gas orifices 120 of the burner plate 60.

The flow control valve 114 is preferably an adjustable type such that it can be opened fully to bypass both the selector valve 62 and the pressure relief valve 112, to obtain a larger flame 126 at the centre of the burner plate 60 if needed.

The pressure relief valve 112 is provided to further improve the safety of the apparatus, as will be understood from the following description. The pressure relief valve 112 monitors the pressure inside the vertical tube 36 and releases a pressure over an unsafe level, to a whistle 128 which has an outlet opening positioned near one of the gas orifices 120. The gas flowing from the whistle 128 may thereby be readily ignited by the flame above that orifice 120, to provide a visual indication of an abnormal operation of the apparatus. The sound of the whistle 128 is yet another sign to alert a user of an over pressure inside the receptacle 22, and to urge that user to set the knob 90 to zero time to cause the timer mechanism 50 to raise the fuel cartridge 34 out of the water.

Figure 6:
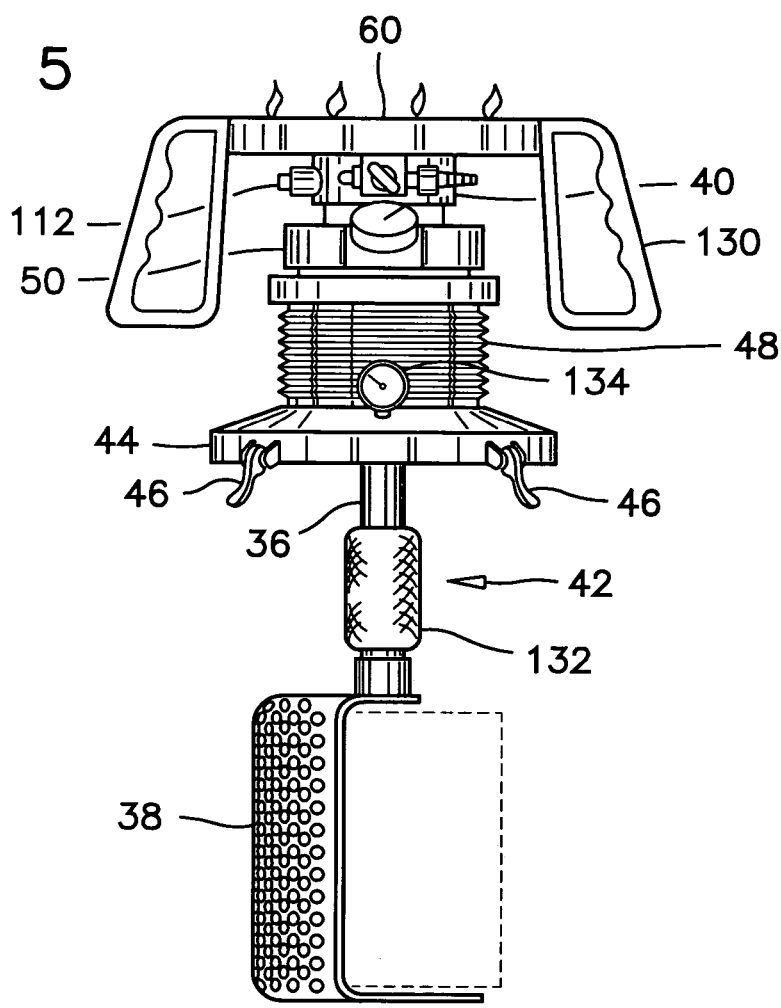
FIG. 6 is a side view of the upper fuel support portion of the energy production apparatus.

As illustrated in FIG. 6, the burner plate 60 preferably has a pair of handles 130 affixed thereto to manipulate the upper portion of the apparatus 20 when the clasps 46 are released and the basket 38 is lifted out of the receptacle 22.

In the preferred apparatus, a gas filter 132 may also be installed over the gas admitting holes 42, for preventing any accumulation of reaction byproducts inside the vertical tube 36. In other embodiments, the vertical tube 36 may be filled with an appropriate granular filtering medium for example for preventing reaction byproducts from reaching the gas handling manifold 40.

As will be appreciated, a pressure gauge 134, a temperature gauge or both, may also be provided on the annular cap 44 or at another convenient location allowing a communication with the receptacle 22, for visually monitoring the development of a reaction occurring inside the apparatus.

Figure 7:
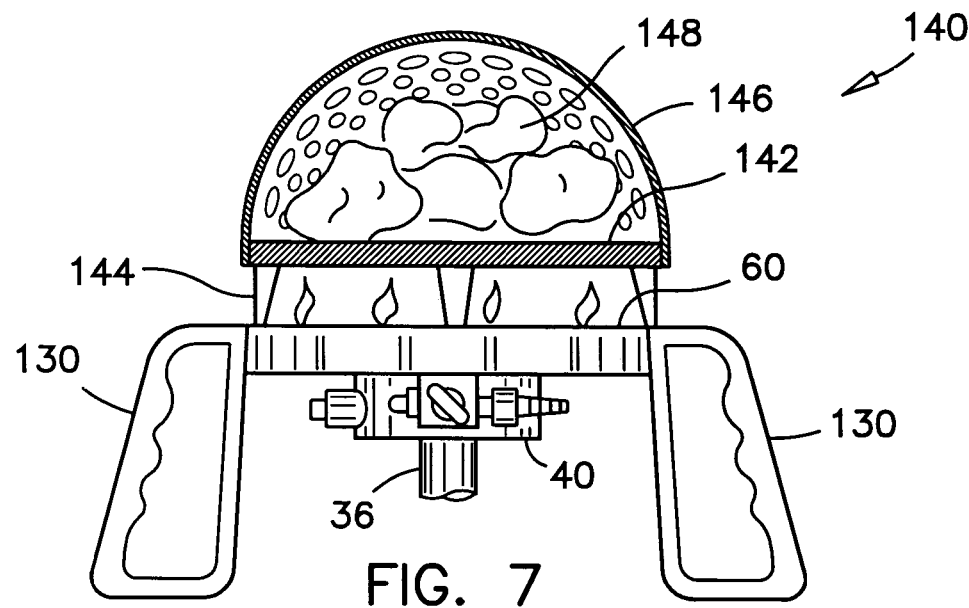
FIG. 7 illustrates a side view of a preferred burner plate and an optional heat storage device for use with the energy production apparatus.

In FIG. 7, the burner plate 60 is shown supporting a heat storage device 140, for storing heat during the operation of the apparatus 20. The heat storage device 140 is used for prolonging the beneficial effect of an energy production period when the apparatus 20 is used to heat a camp in the wilderness, or a household during a power outage period for example. The preferred heat storage device 140 comprises a copper plate 142, supported on legs 144, above the burner plate 60, and a perforated dome-shape enclosure 146 enclosing one or more rocks 148 laid over the upper portion of the copper plate 142. The heat storage device 140 is removable from the burner plate 60 and is preferably used whenever the burner plate 60 is not used for cooking food. Further, the receptacle 22 is preferably made of steel or similar heat conductive material for radiating heat during the entire energy production period.

In the preferred embodiment, the inside diameter of the bellows 48 is sufficiently large, 15-25 cm for example, and the spring 94 is calibrated such that the weight of the heat storage device 140 or the weight of a common cooking pot (not shown) which may be set on the burner plate 60 does not significantly affect the operation of the bellows 48 or of the timer mechanism 50.

Referring now to FIGS. 10-13, several arrangements are proposed for preparing the fuel elements required for use in the hydrogen generator 20 according to the preferred embodiment. The fuel bundle 34 is preferably prepared by overlaying a thin strip of aluminum 150 over a sheet of embossed paper 152 impregnated with sodium hydroxide in a dry form. The aluminum sheet and the paper layer are coiled together to form a cylindrical shape. The preferred cartridge 34 is loosely coiled such that water may be readily absorbed between the layers of the cartridge. The advantage of a loosely coiled cartridge 34 is that the water is allowed to seep into the entire cartridge at once to create an intense reaction, and reduce the duration of the heating phase 'A' of the reaction as illustrated in FIG. 14.

Another advantage of the cartridge 34 as described above is that when the layers of the coil are set vertically, the hydrogen gas generated between the layers rises up and creates a vacuum between the layers at the lower end of the cartridge 34 to admit more water from the lower end of the cartridge. This phenomenon is advantageous for wetting the aluminum strip quickly, entirely and continuously.

The preferred fuel cartridge 34 is packaged in a sealed envelope that has an indication as to its duration, potential heat energy and volume of hydrogen gas to be produced by it.

Figure 11:
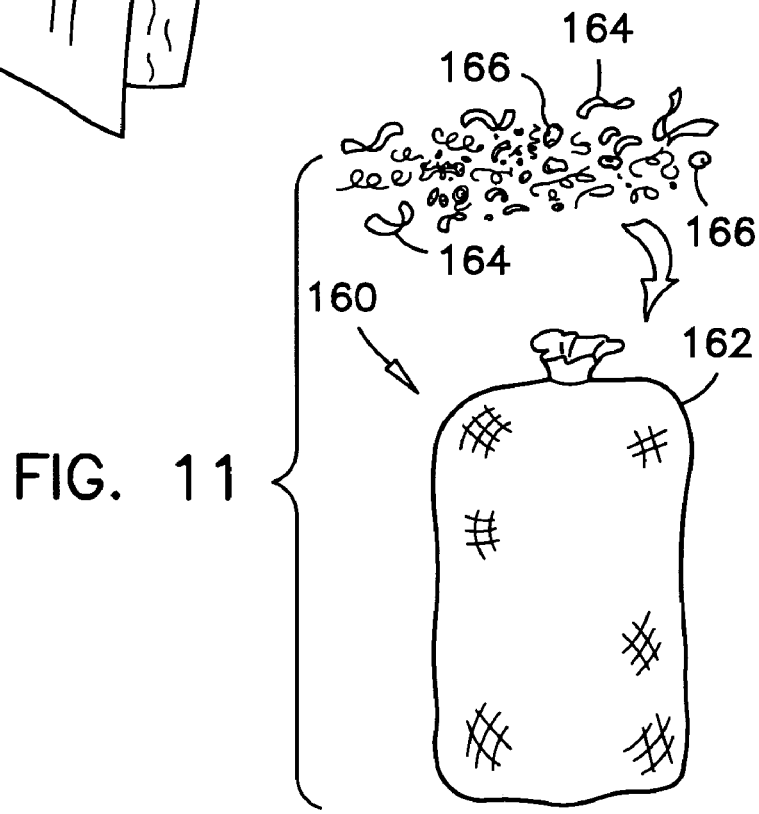
FIG. 11 illustrates a second arrangement for a fuel unit for use with the energy production apparatus.

Although the fuel cartridge 34 may be better manufactured with virgin material, it will be appreciated that there are numerous economical and environmental advantages in the manufacturing of fuel elements from waste materials. Accordingly, another preferred fuel unit 160 having a loose content in a bag-like envelope is illustrated in FIG. 11. The envelope 162 is water-permeable, and the loose content comprises aluminum turning, aluminum saw dust and filings, aluminum shreds and other aluminum waste particles 164 as normally found in a metal working shop, or as available from scrap metal vendors.

It is also possible to use aluminum shreds from domestic waste containers. When the waste aluminum is obtained by shredding food or drink containers for example, the waste material is preferably pre-treated to at least partly remove a protective coating on this aluminum material.

The loose content of the fuel unit 160 also comprises waste paper bits 166 impregnated with sodium hydroxide and dried. The paper bits 166 are made of waste newsprint or similar recyclable paper waste. The paper bits 166 preferably have sizes and quantities similar to the aluminum particles, and are mixed with the aluminum particles 164. The presence of the paper bits 166 prevents the fusion of the aluminum particles 164 together and ensures a continuous absorption of water throughout the loose content of the fuel unit 160. The fuel unit 160 is also preferably manufactured and labelled as to indicate its expected energy production period.

Figure 12:
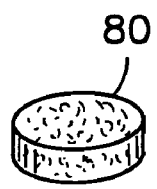
FIG. 12 illustrates one form for the fuel pellet for use with the energy production apparatus.

The fuel pellet 80 as illustrated in FIGS. 2 and 12, and as previously described contains very fine aluminum particles such as saw dust and filings for example, to provide a better water contact and a more intense reaction. One or two fuel pellets 80 are preferably packaged in a sealed envelope and distributed as reaction accelerators with each fuel cartridge 34, or with each fuel unit 160 sold.

Figure 13:
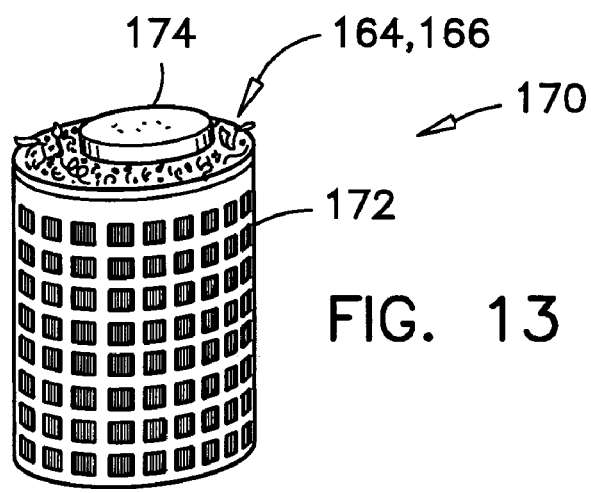
FIG. 13 illustrates a third arrangement for a fuel unit for use with the energy production apparatus.

A third preferred arrangement for a fuel element usable in the apparatus 20 according to the preferred embodiment is illustrated in FIG. 13. The fuel measure 170 is preferably comprised of a perforated container 172 filled with aluminum waste 164 and paper bits 166 as previously described.

When the energy production apparatus according to the preferred embodiment 20 is used by someone having access to aluminum waste material, and who does not want to depend on purchased fuel elements, the fuel measure 170 described herein is recommended and is preferably used with a nominal quantity of sodium hydroxide 174 set over the fuel measure 170. The sodium hydroxide 174 may be compressed into a tablet form as illustrated for easy handling and storage. It may be used in a powder form contained in a water-permeable sachet (not shown), or may be kept in a sealed container and sprinkled generously over the water 32 before introducing the fuel measure 170 into the water 32.

As to the manner of manufacture of the preferred apparatus and carrying the catalytic reaction, the same should be apparent from the above description and accompanying drawings, and accordingly further discussion relative to this aspect would be considered repetitious and is not provided.

Figure 15:
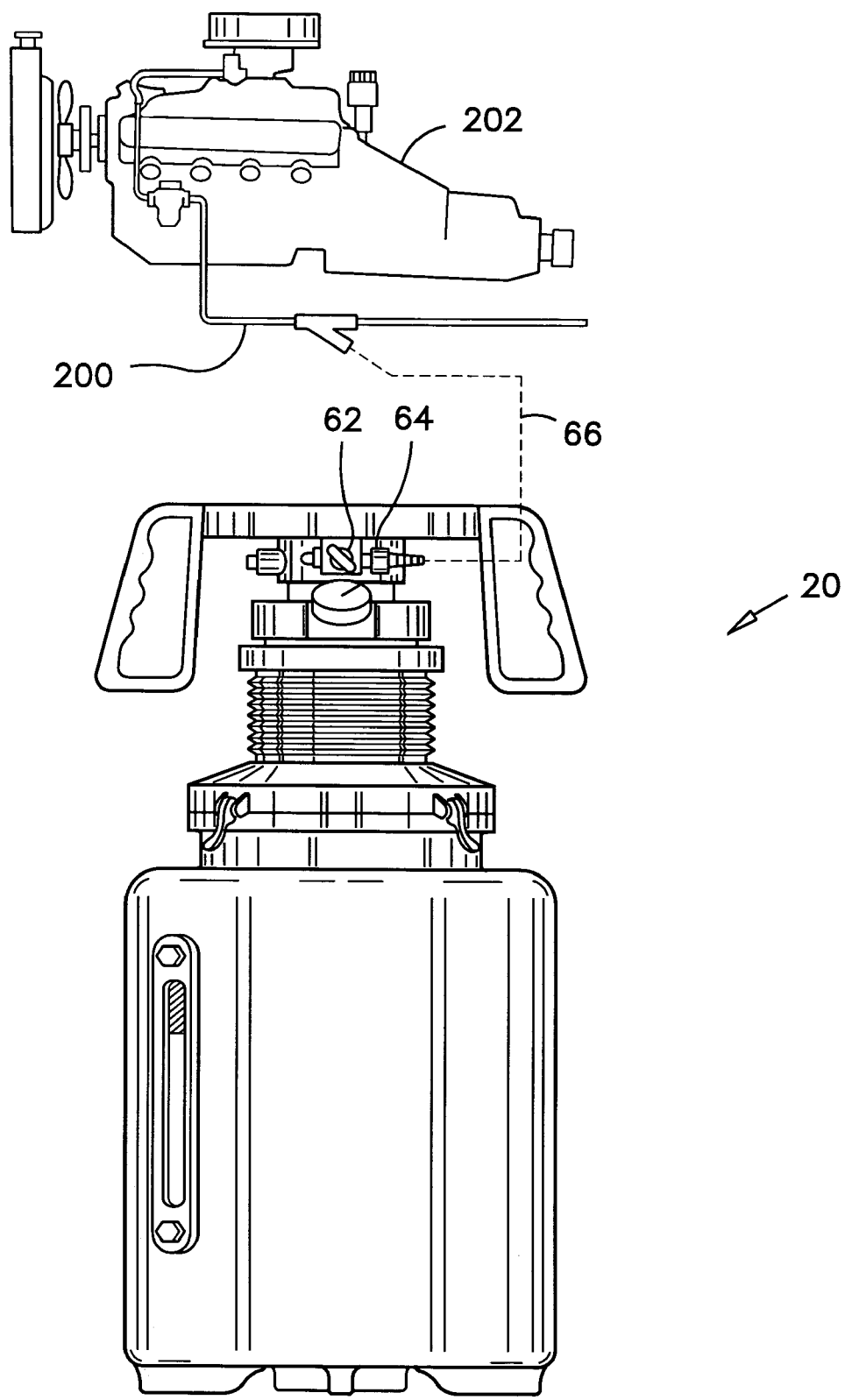
FIG. 15 illustrates a portable hydrogen generator according to the preferred embodiment of the present invention with a conduit to an internal combustion engine, wherein the hydrogen gas produced is injected into the fuel to the engine.
Figure 16:
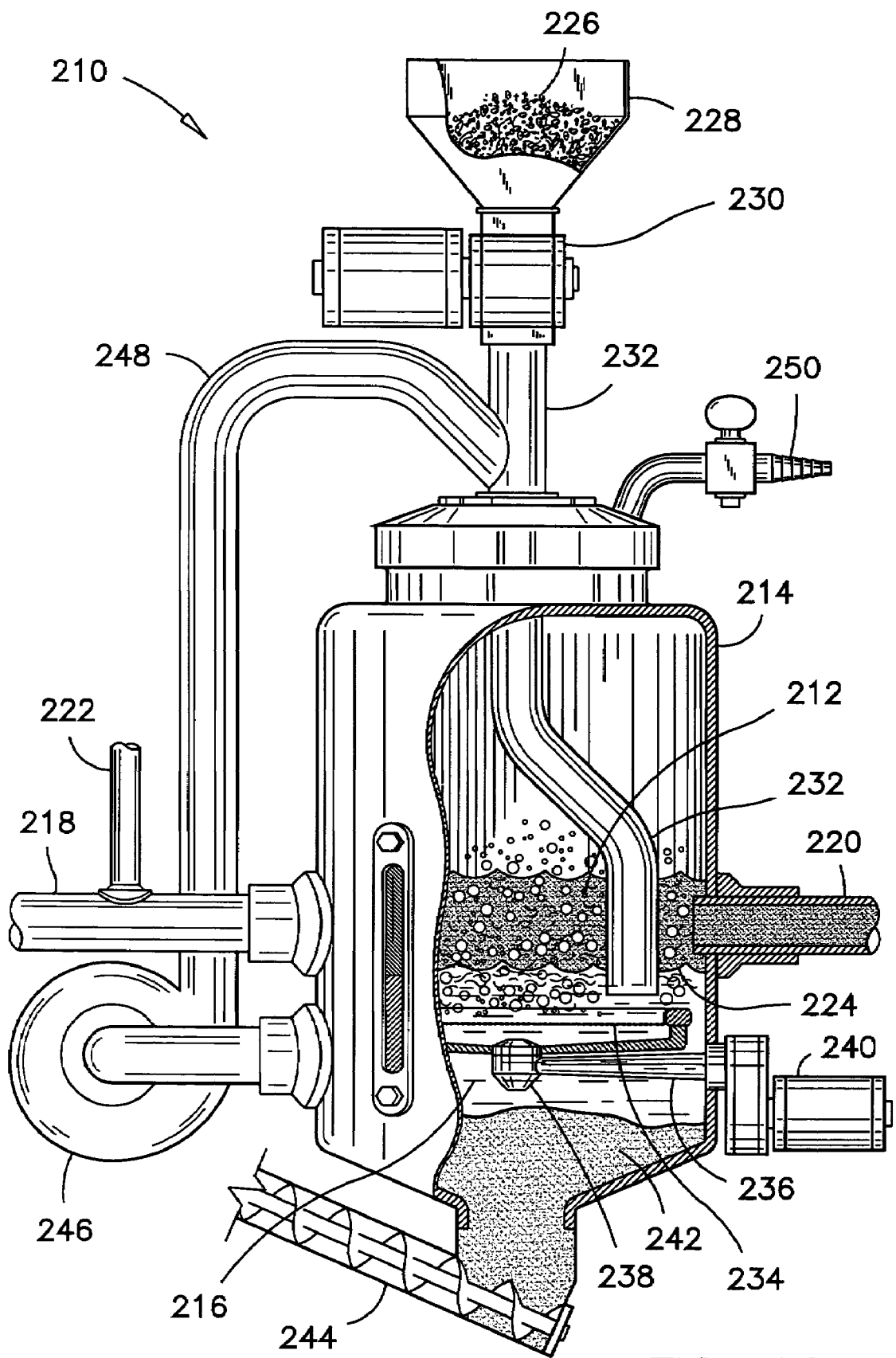
FIG. 16 illustrates an hydrogen generator according to an alternate embodiment of the present invention wherein the hydrocarbon fuel is fed directly into the receptacle for the mixing of the hydrogen gas therewith.

Referring now to FIGS. 15 and 16, an industrial application of the hydrogen gas generator according to the present invention will be described. It has been observed that when the hydrogen gas produced by the apparatus is bubbled through an hydrocarbon fuel, the combustion efficiency of this fuel is greatly improved. Although this phenomenon is not fully understood, it is believed that the hydrogen molecules tend to join hydrocarbon chains within the fuel and form new and shorter hydrocarbon chains or increase the abundance of the shorter hydrocarbon chains. It is known that the shorter hydrocarbon chains are generally more flammable, and burn more efficiently with less pollution.

The apparatus according to the preferred embodiment 20 is portable and can be used advantageously for example to inject hydrogen gas into a fuel line 200 of an internal combustion engine 202 to hydrogenate this fuel before it reaches the engine. Although a gasoline engine 202 is illustrated in FIG. 15, it will be appreciated that the same concept applies to diesel engines and to the burners of furnaces and boilers, and virtually any other equipment burning a liquid fossil fuel.

Referring now to FIG. 16 there is illustrated therein an alternate embodiment 210 of the apparatus of the present invention for use to hydrogenate hydrocarbon fuels for large stationary engines and the burners of boilers. In this alternate embodiment, the fuel 212 is introduced inside the receptacle 214 containing an aqueous solution 216 comprising sodium hydroxide, through a fuel inlet pipe 218. This fuel floats over the aqueous solution and leaves the receptacle through a fuel outlet pipe 220. The flow control valves and check valves on the fuel line have not been illustrated for clarity. Also for a better understanding of the invention, the illustration in FIG. 16 has not been drawn to scale.

Makeup water is added through a makeup water inlet pipe 222 on the fuel inlet pipe 218 or otherwise, to maintain the level 224 of the aqueous solution stable. The level control equipment for maintaining the level of the aqueous solution stable has not been illustrated for being known to those skilled in the art of hydraulics.

Aluminum particles 226 for the reaction are introduced in the receptacle 216 from a hopper 228 mounted atop the receptacle 214, then through a rotary feeder 230, and down an aluminum feed pipe 232. The aluminum feed pipe 232 extends under the level 224 of the aqueous solution and ends immediately above a horizontally-rotating screen disc 234. The screen disc 234 is supported on an arm 236 and spindle 238, and is driven by a gear motor 240 mounted to the side of the receptacle 214 and having a shaft and pinion (not shown) extending inside the arm 236 and spindle 238.

The alumina 242 generated by the reaction is collected at the bottom of the receptacle 214 and is recovered by means of a screw conveyor 244 or otherwise without stopping the reaction.

In order to prevent excessive reaction of the aluminum particles with water inside the aluminum feed pipe 232, a circulation pump 246 and recirculating piping 248 are provided to circulate the aqueous solution from the receptacle and into the aluminum feed pipe 232, to continuously carry away the aluminum particles 226 from inside the aluminum feed pipe 232 and onto the screen 234.

The hydrogen gas generated at the screen level bubbles through the layer of fuel 212 for hydrogenating this fuel. The hydrogen gas not absorbed into the fuel 212 is recovered through an outlet valve and fitting 250 on the cover of the receptacle for use in another application. This hydrogen gas is relatively clean of water vapour for having been filtered through the fuel.

This alternate embodiment of a hydrogen gas generator is believed to be particularly useful to improve the combustion characteristics of diesel fuels and heavier fuel oils for stationary installations such as engine-generator sets and large industrial boilers.

While two embodiments of an apparatus for producing hydrogen gas and for hydrogenating hydrocarbon fuels have been described herein above, it will be appreciated by those skilled in the art that various modifications, alternate materials, compositions and equivalents may be employed without departing from the true spirit and scope of the invention. Therefore, the above description and illustrations should not be construed as limiting the scope of the invention which is defined by the appended claims.

I claim:

1. An apparatus for hydrogenating hydrocarbon fuel, comprising:
   a receptacle having a hydrogen gas generating region at a lower inner portion of said receptacle, a hydrocarbon fuel treatment region at an intermediate inner portion of said receptacle and above said hydrogen gas generating region, and a hydrogen gas recovery region at an upper inner portion of said receptacle and above said hydrocarbon fuel treatment region, said lower inner portion of said receptacle containing an aqueous solution;
   means for introducing aluminum particles in said hydrogen gas generating region for generating hydrogen gas in said hydrogen gas generating region;
   means for recovering hydrogen gas in said hydrogen gas recovery region and for creating a vertical flow of hydrogen gas between said hydrogen gas generating region and said hydrogen gas recovery region; and means for introducing a hydrocarbon fuel into said receptacle and for circulating said hydrocarbon fuel inside said receptacle along a horizontal flow path in said hydrocarbon fuel treatment region, across said vertical flow of hydrogen gas, and in contact with said hydrogen gas for hydrogenating said hydrocarbon fuel.

2. The apparatus as claimed in claim 1, wherein said means for introducing aluminum particles in said hydrogen gas generating region includes a screen disc mounted in said hydrogen gas generating region for receiving aluminum particles thereon and an aluminum feed tube having one end external to said receptacle and an opposite end located immediately above said screen disc for delivering aluminum particles onto said screen disc.

3. The apparatus as claimed in claim 2, wherein said means for introducing said hydrocarbon fuel into said receptacle is an inlet pipe and means for circulating said hydrocarbon fuel inside said receptacle along a horizontal flow path in said hydrocarbon fuel treatment region includes said inlet pipe and an opposite outlet pipe being horizontally inline with each other and adjacent said hydrocarbon fuel treatment region.

4. The apparatus as claimed in claim 3, wherein said apparatus further includes, in said hydrogen gas generating region, means for maintaining said aqueous solution at a predetermined level above said screen disc, above said opposite end of said aluminum feed tube, and below said inlet and outlet pipes.

5. The apparatus as claimed in claim 4, wherein said apparatus further includes means to introduce makeup water into said receptacle.

6. The apparatus as claimed in claim 4, wherein said apparatus further includes means to recover precipitates from said receptacle below said hydrogen gas generating region.

7. The apparatus as claimed in claim 4, wherein said means for introducing aluminum particles in said hydrogen gas generating region further includes an aluminum particle hopper mounted above said receptacle and a rotary feeder mounted between said aluminum particle hopper and said aluminum feed tube for feeding aluminum particles into said aluminum feed tube.

8. The apparatus as claimed in claim 7, wherein said apparatus further includes means for circulating said aqueous solution from said hydrogen gas generating region and into an upper external segment of said aluminum feed tube.

9. The apparatus as claimed in claim 8, wherein said apparatus further includes means for rotating said screen disc in a horizontal plane.

10. The apparatus as claimed in claim 8, wherein said means for circulating said aqueous solution includes an external circulation pipe and an external circulation pump between said lower inner portion of said receptacle and said upper external segment of said aluminum feed tube.

11. The apparatus as claimed in claim 10, wherein said aqueous solution contains sodium hydroxide.

12. The apparatus as claimed in claim 10, wherein said apparatus includes means for introducing said aqueous solution into said lower inner portion of said receptacle.

* * * * *

UNITED STATES PATENT AND TRADEMARK OFFICE
CERTIFICATE OF CORRECTION

PATENT NO. : 7,326,263 B2 Page 1 of 1
APPLICATION NO. : 10/729012
DATED : February 5, 2008
INVENTOR(S) : Erling Reidar Andersen It is certified that error appears in the above-identified patent and that said Letters Patent is hereby corrected as shown below:

Title page,

Item (74), Attorney, Agent, or Firm, amend name "Mario Theviault" to read -- Mario Theriault --.

Signed and Sealed this

Seventeenth Day of June, 2008

JON W. DUDAS
*Director of the United States Patent and Trademark Office*